United States Patent
Frey

(10) Patent No.: US 9,466,111 B2
(45) Date of Patent: Oct. 11, 2016

(54) METHOD AND DEVICE FOR DETERMINING OR ALIGNING THE ANGULAR POSITION OF INDIVIDUAL WIRES WITHIN A SHEATHED CABLE CONTAINING TWISTED WIRES

(71) Applicant: Komax SLE GmbH & Co., KG, Grafenau (DE)

(72) Inventor: Werner Frey, Grafenau (DE)

(73) Assignee: KOMAX SLE GMBH & CO., KG, Grafenau (DE)

( * ) Notice: Subject to any disclaimer, the term of this patent is extended or adjusted under 35 U.S.C. 154(b) by 7 days.

(21) Appl. No.: 14/681,276

(22) Filed: Apr. 8, 2015

(65) Prior Publication Data

US 2015/0287180 A1 Oct. 8, 2015

(30) Foreign Application Priority Data

Apr. 8, 2014 (DE) .................. 10 2014 005 242

(51) Int. Cl.
*G06K 9/00* (2006.01)
*G06T 7/00* (2006.01)
*H01R 43/28* (2006.01)
(Continued)

(52) U.S. Cl.
CPC ............ *G06T 7/004* (2013.01); *G01B 11/26* (2013.01); *G06K 9/52* (2013.01); *G06T 7/0012* (2013.01); *H01R 43/28* (2013.01); *H02G 1/1248* (2013.01); *H02G 1/1292* (2013.01)

(58) Field of Classification Search
None
See application file for complete search history.

(56) References Cited

U.S. PATENT DOCUMENTS 3,847,190 A * 11/1974 Forester ............ H01B 13/0235
140/149
4,012,894 A * 3/1977 Akachi ............ H01B 13/0235
57/293

(Continued)

FOREIGN PATENT DOCUMENTS

DE 3144281 A1 5/1983
DE 3440711 A1 5/1985
(Continued)

OTHER PUBLICATIONS

Wang et al., "Mathematical Model for Determination of Strand Twist Angle and Diameter in Stranded-Wire Helical Springs", Springer, Journal of Mechanical Science and Technology, 2010.*

*Primary Examiner* — Aaron W Carter
(74) *Attorney, Agent, or Firm* — J-TEK Law PLLC; Jeffrey D. Tekanic; Scott T. Wakeman

(57) ABSTRACT

A method is disclosed for determining an angular position of individual wires at a predetermined cross-sectional position in a multi-wire sheathed cable, which has, inside a sheath, a plurality of individual wires twisted around one another with a predetermined lay length. The angular position of the individual wires is determined relative to a reference direction, which extends through the central longitudinal axis of the sheathed cable. The method includes: determining an end angle position of the ends of the individual wires relative to the reference direction at an end of the sheathed cable, determining the distance between the end of the sheathed cable and the predetermined cross-sectional position in the longitudinal direction of the sheathed cable, and determining the angular position of the individual wires relative to the reference direction at the predetermined cross-sectional position based upon the end angle position, the lay length, the twist direction, and the distance.

20 Claims, 1 Drawing Sheet

(51) Int. Cl.
*G01B 11/26* (2006.01)
*G06K 9/52* (2006.01)
*H02G 1/12* (2006.01)

(56) References Cited

U.S. PATENT DOCUMENTS

| | | | | |
|---|---|---|---|---|
| 4,530,205 | A * | 7/1985 | Seiler | D07B 1/08 57/311 |
| 4,604,861 | A * | 8/1986 | Matsuura | D07B 1/0693 57/311 |
| 4,757,675 | A * | 7/1988 | Oglesby | G02B 6/4489 57/13 |
| 4,872,824 | A * | 10/1989 | Williams | G02B 6/4489 226/177 |
| 4,902,129 | A * | 2/1990 | Siegmund | A61B 1/0008 33/377 |
| 5,040,940 | A | 8/1991 | Kolodziej et al. | |
| 5,126,167 | A * | 6/1992 | Matsuno | G02B 6/4407 264/1.28 |
| 5,239,813 | A * | 8/1993 | Baumgarten | B29C 47/02 156/244.12 |
| 5,419,025 | A | 5/1995 | Murakami et al. | |
| 5,950,505 | A * | 9/1999 | Locher | H02G 1/12 30/90.6 |
| 6,256,439 | B1 * | 7/2001 | Brown | G02B 6/449 385/110 |
| 6,285,957 | B1 * | 9/2001 | Tanaka | G06F 17/5036 702/57 |
| 6,378,283 | B1 * | 4/2002 | Barton | H01B 11/04 57/314 |
| 2009/0260735 | A1 * | 10/2009 | Sasabe | B60C 15/04 152/540 |
| 2012/0182130 | A1 * | 7/2012 | Sarchi | G01L 5/047 340/10.1 |
| 2013/0322835 | A1 * | 12/2013 | Butler | G02B 6/4403 385/114 |

FOREIGN PATENT DOCUMENTS

| | | |
|---|---|---|
| EP | 0368073 A2 | 5/1990 |
| EP | 0600415 B1 | 6/1994 |
| EP | 1113539 A2 | 7/2001 |
| GB | 2149502 A | 6/1985 |

* cited by examiner

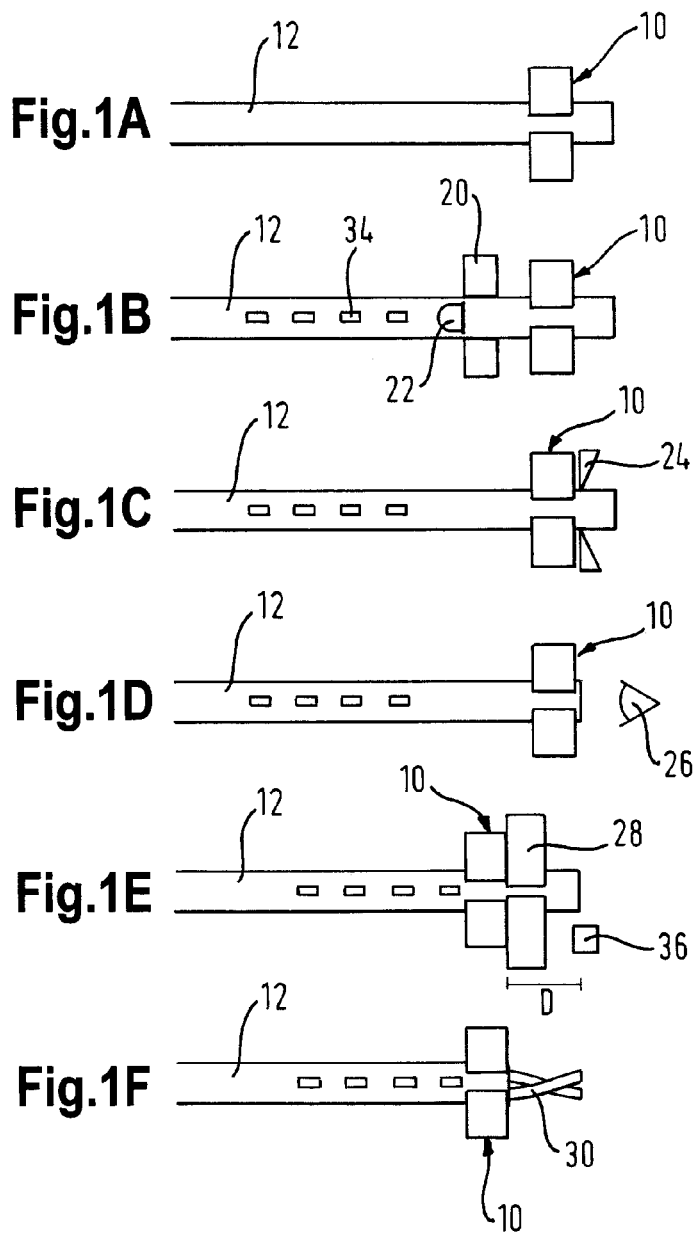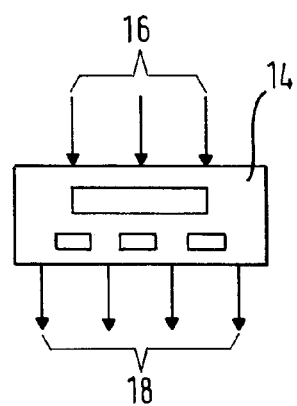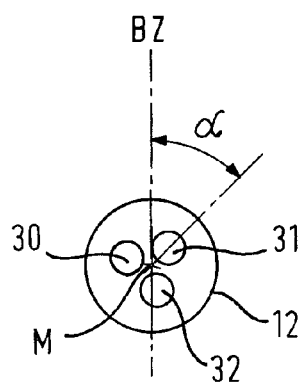

METHOD AND DEVICE FOR DETERMINING OR ALIGNING THE ANGULAR POSITION OF INDIVIDUAL WIRES WITHIN A SHEATHED CABLE CONTAINING TWISTED WIRES

CROSS-REFERENCE TO RELATED APPLICATION

The present application claims priority to German patent application serial number 10 2014 005 242.7 filed on Apr. 8, 2014, the contents of which are incorporated fully herein.

TECHNICAL FIELD

The present invention generally relates to methods for determining the angular position of one or more individual (twisted) wires (lines) in a multi-wire (multi-core) sheathed cable (twisted wire) at a predetermined cross-sectional position in the longitudinal direction of the sheathed cable. The invention further relates to devices capable of carrying out such methods.

BACKGROUND ART

When multi-wire sheathed cables containing twisted wires are processed, e.g., to strip the sheath and wire insulation and to then crimp terminals (contacts) onto the ends of the bare wires, it can be advantageous to know the orientation and/or the angular position and/or the position of the individual (twisted) wires within the still-present sheath (jacket) at a particular position along the longitudinal direction of the sheathed cable. This knowledge of the angular position of the individual wires can be advantageous, for example, to precisely strip the insulation using die blades, to perform an intermediate stripping, to remove grounding structures, such as ground wires, shielding layers (either inside or outside the sheath), mechanical stabilizing fibres or layers, foil, etc., to orient an individual wire or an individual wire group in a machine, etc.

In order to prepare the ends of the individual wires of a sheathed cable, it is known from DE 31 44 281 A1 to first strip the sheath (jacket) and then to mechanically scan the individual-wire ends, which protrude from the sheath, while rotating the sheathed cable, and to maintain a predetermined rotational position. At least one of the individual-wire ends that is still provided with colored insulation is then detected (sensed) by an optical scanning head to determine the color or the lightness (tone) of the insulation. This process is repeated until the specially color-coded insulated conductor is located in a predetermined rotational position.

EP 0 600 415 B1 discloses a device for crimping a cable-end terminal onto a sheathed cable that has distinguishing features printed on its exterior in its longitudinal direction. Before crimping the cable-end terminal, the sheathed cable is held and rotated by a rotating device until the distinguishing features are located in a predetermined rotational orientation. To determine when the predetermined rotational orientation has been reached, an optical sensor is disposed on the rotating device and detects the distinguishing features while the sheathed cable is rotating. The rotation of the sheathed cable is stopped when optical sensor detects that the distinguishing features are located in the predetermined rotational orientation or angular position.

A method for orienting individual wires, which are provided with insulation and protrude from the sheath of a sheathed cable, is known from EP 0 368 073 A2 and its English family member U.S. Pat. No. 5,040,940, wherein the color of the insulation of at least one of the individual wires is detected and the sheathed cable is then rotated about its longitudinal direction until the individual wires assume a predetermined angular position.

SUMMARY OF THE INVENTION

It is an object of one aspect of the present teachings to determine the angular position(s) of one or more individual (twisted) wires (lines) of a multi-wire (multi-core) sheathed cable at a predetermined cross-section in the longitudinal direction of the sheathed cable without having to expose (strip) the individual wires at the predetermined position.

According to one representative, non-limiting embodiment of the present teachings, a method is provided for aligning a multi-wire sheathed cable containing a plurality of individual wires, wherein the plurality of individual wires are twisted around one another in a twist direction (+/−) and with a lay length (S), the plurality of individual wires are disposed within a sheath, and a reference direction is perpendicular to a central longitudinal axis of the sheathed cable. The method includes determining a desired angle position ($\beta$) of at least one of the plurality of individual wires relative to the reference direction at a predetermined cross-sectional position in a longitudinal direction of the sheathed cable. Furthermore, a distance (D) is determined between an end of the sheathed cable and the predetermined cross-sectional position in the longitudinal direction of the sheathed cable. Then, a target end angle position ($\alpha$) of the at least one of the plurality of individual wires relative to the reference direction at the end of the sheathed cable is calculated based upon the desired angle position ($\beta$) of the at least one of the plurality of individual wires at the predetermined cross-sectional position, the lay length (S), the twist direction (+/−), and the distance (D). Then, the sheathed cable is rotated about its longitudinal axis until the actual end angle position of the at least one of the plurality of individual wires matches the calculated target end angle position of the at least one of the plurality of individual wires. Thus, such an embodiment provides the advantage that the precise angular or rotational position of one or more of the twisted wires can be known or set, e.g., prior to stripping the sheath to expose the individual wires.

According to another representative, non-limiting embodiment of the present teachings, a method is provided for determining the angular position(s) of one or more individual (twisted) wires at a predetermined cross-sectional position in a multi-wire sheathed cable. Inside its sheath, the multi-wire sheathed cable includes a plurality of individual wires that are twisted around one another with a predetermined lay length (twist pitch). The angular position(s) of the individual wires is (are) preferably determined relative to a reference direction, which extends through the center of the sheathed cable, in a plane perpendicular to the longitudinal extension of the sheathed cable. The method may be performed, e.g., by determining, at an end (a terminal end) of the sheathed cable, an end angle position of the ends of the individual wires relative to the reference direction. Either before or after this determining step, a distance between the end of the sheathed cable and the predetermined cross-sectional position in the longitudinal direction of the sheathed cable is determined or selected. Then, the angular position(s) of one or more the individual wires relative to the reference direction at the predetermined cross-sectional position is determined based upon the lay length, the twist direction of the individual wires, and the (longitudinal)

distance that was selected or determined. Preferably, the angular position(s) is (are) determined (calculated) at a longitudinal point of the sheathed cable that has not yet been stripped or exposed, such that the outer insulating (opaque) sheath (jacket) is still disposed around the individual wires. Thus, such an embodiment also provides the advantage that the precise angular or rotational position of one or more of the twisted wires can be known, e.g., prior to stripping the sheath to expose the individual wires.

According to another representative, non-limiting embodiment of the present teachings, a device capable of carrying out the one or both of above-described methods preferably includes a camera configured to generating image data of a cross-sectional view of an end (a terminal end) of the sheathed cable, where the ends of the individual (twisted) wires are visible. An evaluation device (controller) is configured to determine from the image data an end angle position of at least one of the individual wires relative to a reference direction or plane (BZ) that extends through (intersects) the center of the sheathed cable. In addition or in the alternative, the evaluation device may determine whether an actual end angle position ($\alpha$) of at least one of the individual wires relative to the reference direction or plane (BZ) matches a target end angle position ($\alpha$) or (ii) the actual end angle position ($\alpha$) of at least one of the individual wires in the cross-sectional view relative to the reference direction. A distance input (determining) device is configured to input (determine) a distance (D) between the end of the sheathed cable and a predetermined cross-sectional position of the sheathed cable in the longitudinal direction of the sheathed cable. A twist input device is configured to input the lay length and the twist direction of the sheathed cable. A calculating device (controller) is configured to determine (calculate) the angular position(s) of at least one of the individual (twisted) wires relative to the reference direction (BZ) at the predetermined cross-sectional position based upon the determined end angle position, the inputted (longitudinal) distance (D), the inputted lay length, and the inputted twist direction. In addition or in the alternative, the calculating device (controller) is configured to determine (calculate) the target end angle position ($\alpha$) of the at least one of the individual wires relative to the reference direction at the end of the sheathed cable based upon a desired angle position ($\beta$) of the at least one of the individual wires at the predetermined cross-sectional position, the distance (D), the lay length (S), and the twist direction (+/−).

The present teachings are generally applicable to a wide variety of multi-wire (multi-core) sheathed cables, which contain, inside a sheath (jacket), a plurality of individual wires (or lines) twisted around one another with a predetermined lay length (i.e. the pitch of the twist, such as the number of twists per meter). The present methods and devices enable the angular or rotational position(s) of one or more twisted wires, which are disposed within an opaque insulating sheath (jacket), to be determined with precision without the need to first expose the twisted wire(s), e.g., by stripping the sheathed cable.

Further objects, embodiments, and advantages of the present teachings will be explained in an exemplary manner in the following with reference to the appended drawings and with further details.

BRIEF DESCRIPTION OF THE DRAWINGS

FIGS. 1A-1F depict schematic views of a representative device according to the present teachings at various stage of processing a sheathed cable, and FIG. 1G shows a control unit configured to control the device.

FIG. 2 depicts a cross-sectional view of an exemplary sheathed cable containing three twisted wires that can be processed according to the present methods and devices.

DETAILED DESCRIPTION

FIGS. 1A-1F show a holder 10 for holding a multi-wire (multi-core) sheathed cable 12 in a series of method steps that utilize a plurality of auxiliary devices to process a multi-wire sheathed cable 12. The multi-wire sheathed cable 12 has, inside an (insulating) sheath (jacket), a plurality of individual wires 30, 31, 32 that are twisted around one another with a predetermined lay length (twist pitch). The twist direction can be clockwise or counterclockwise depending on from which end (point) the sheathed cable 12 is viewed. As shown in FIG. 1G, an electronic control unit 14 has inputs 16 and outputs 18 that are utilized to control the device. As will be explained in the following, the electronic control unit 14 is operatively connected to the auxiliary devices, and comprises storage (memory) for storing inputted data and program storage (memory) having programs stored therein in a known manner. The programs are executed by one or more processors, e.g., one or more microprocessors and/or one or more analog calculating circuits, to perform the method steps that are discussed in the following.

Only the holding (clamping) jaws of the holder 10 are depicted, because the construction of the holder 10 is known in the wire-processing art. The sheathed cable 12 is guided (inserted) through the holding jaws while the holder 10 is in the open state and then is held by the holding jaws such that the sheathed cable 12 cannot rotate and is not displaceable in the longitudinal direction of the sheathed cable 12. The holding jaws are controlled by an actuator that is, e.g., configured to execute a wire clamping function.

In FIG. 1B, a rotating device 20 and an optical recording (sensing) device 22 are also shown. The rotating device 20 comprises, for example, three rotationally-drivable rollers, which abut on the circumference of the sheathed cable 12. The construction of such a rotating device is also known in the wire-processing art and may include, e.g., a motor generating a rotary output that is operatively coupled to one or more of the rollers. For example, one roller may be directly driven by the motor and the other two rollers merely rotatably support the cable 12 in a passive manner. However, two or more (e.g., all) of the rollers may be directly driven by the motor. The rotatable rollers are radially movable into abutment on the outer surface (circumference) of the sheathed cable 12.

The optical recording (sensing) apparatus 22 can be an electronic camera, for example, which detects (captures) an image provided (e.g., printed) on a portion of the exterior (circumferential surface) of the sheathed cable 12. For example, the camera may be a CCD-based or CMOS-based digital camera and known image recognition software may be used to determine the information (e.g., alphanumeric codes) and/or image provided (printed) on the exterior of the sheathed cable 12. In the alternative, if a bar code or similar marking is provided on the exterior of the sheathed cable 12, a laser scanning device may be utilized. The present teachings are not particularly limited in this regard, and any type of optical sensor or image sensor may be utilized that is capable of reading or deciphering (detecting and conveying) the information and/or image disposed on the sheathed cable 12, as will be further discussed below.

In FIG. 1C, a cutting device 24 is shown and is used to sever or cut the sheathed cable 12 to expose an end (a terminal end) thereof. Such wire cutting devices are also known in the wire processing art and the present teachings are not particularly limited in this regard. The blades or cutting edges of the cutting device 24 are operated by an actuator that is configured, e.g., to radially inwardly move the blades or cutting edges to perform the cutting function. The cutting device 24 may comprise two or more sharp/cutting edges, or may comprise, e.g., one sharp/cutting edge and one blunt surface.

In FIG. 1D, an electronic camera 26 is shown that generates (captures) image data containing a cross-sectional view of the (cut) end of the sheathed cable 12. Similar to the optical recording device 22, the electronic camera 26 may be a CCD-based or CMOS-based digital camera. Known image recognition software may be used to determine the angular position(s) of one or more of the individual wires 30, 31, 32 located in the interior of the sheathed cable 12 based upon the image data generated by the electronic camera 26. The present teachings are not particularly limited in this regard, and any type of optical sensor or image sensor may be utilized that is capable of reading the positions of the individual wires 30, 31, 32 disposed on the sheathed cable 12, as will be further discussed below.

FIG. 1E shows how the holder 10 has been moved to the left relative to the sheathed cable 12 by a distance D, as compared to its longitudinal position in FIGS. 1A-1D. The relative movement between the holder 10 and the sheathed cable 12 can be performed such that, while it is in the opened state, the holder 10 moves to the left along the sheathed cable 12 by the distance D as shown in FIG. 1E, or in the alternative, such that the sheathed cable 12 is displaced to the right through the (stationary) holder 10 by the distance S. Suitable devices for facilitating the relative movement between sheathed cable 12 and the holder 10 are well known in the art and may comprise, e.g., a linear actuator operatively coupled to one of the holder 10 or the cable 12. The relative displacement D, which is preselectable, may be detected by a displacement measuring device 36. In FIG. 1F, a wire stripping device 28 is shown that removes or strips the sheath (jacket) of the sheathed cable 12 so that the individual wires 30, 31, 32 are exposed as shown in FIG. 1F. A further device for stripping the exposed individual wires 30, 31, 32 may be provided, if necessary, for a further wire processing step, e.g., in case contact terminals will be crimped onto the bare individual wires 30, 31, 32.

The actuators for the holder 10, the rotating device 20, the cutting device 24, and the stripping device 28 as well as the relative movement device for moving the holder 10 and the sheathed cable 12 relative to each other by the distance S, which is optionally preselectable using the control unit 14, are respectively connected to outputs of the control unit 14. The optical recording device 22 as well as the camera 26 and, optionally, one or more further position-recording devices and the displacement measuring device 36 are respectively connected to inputs 16 of the control unit 14.

The displacement measuring device 36 may be implemented based upon a variety of technologies. For example, the displacement measuring device 36 may comprise a roller or wheel that rotatably contacts the sheathed cable 12 and a rotation sensor is operably coupled to the roller or wheel. As the sheathed cable 12 is moved along its longitudinal axis relative to the roller/wheel, the roller/wheel rotates and the rotation sensor outputs a signal representative of the longitudinal distance that the sheathed cable 12 has been moved. This signal may be, e.g., input into the control unit 14, where a calculation is performed, e.g., by multiplying the length of the outer circumference of the roller/wheel by the number of rotations (whole and/or partial) that the roller/wheel experienced during the longitudinal movement of the sheathed cable 12.

In the alternative, the displacement measuring device 36 may be implemented with a length gauge, a linear encoder, a laser rangefinder (laser distance measurer), an imaging optical system (camera-based system) or a linear position sensor, which may include, e.g., a Hall-effect device, a capacitive displacement sensor, etc.

A representative method according to the present teachings will now be described in an exemplary manner using the above-described device. In this method, the holder 10 can be disposed on a transport device and moved to different stations of a cable processing device. In the alternative, the devices provided in addition to the holder 10 can instead be transported to the holder 10 or can be disposed near it so that the holder 10 can be stationary. Thus the present teachings are not particularly limited to embodiments in which the holder 10 is movable or stationary.

As shown in FIG. 1B, the rotating device 20 and the recording device 22 are moved against (towards) the sheathed cable 12, which protrudes from the holder 10, so that the rotating device 20 abuts on the cable 12 on the side of the holder 10 that is opposite of the protruding (terminal) end of the sheathed cable 12. The holder 10 is opened to release its hold/clamping of the cable 12 and the rotating device 20 is operated so that the sheathed cable 12 rotates about its longitudinal axis. The optical recording device 22 senses (captures) the outer surface of the sheathed cable 12 and, in particular, the markings 34 printed thereon. As soon as the markings 34 are sensed (detected), the operation of the rotating device 20 is stopped so that the optical recording device 22 can read the markings 34 and output a signal representative thereof to the control unit 14.

The marking data sensed (detected) by the recording device 22 are then evaluated in the control unit 14. The marking data preferably provides (encodes or represents) information concerning the twist of the individual wires 30, 31, 32 contained in the sheathed cable 12. For example, the markings 34 preferably provide information concerning the twist direction (from left to right, along the sheathed cable 12, in the clockwise direction or counterclockwise direction) of the individual wires 30, 31, 32, and/or the lay length or twist pitch of the individual wires 30, 31, 32. The lay length or twist pitch is the distance measured in the longitudinal direction of the sheathed cable 12, for which one twist of 360° of the individual wires 30, 31, 32 has occurred, i.e. the distance between two successive longitudinal positions of the same radial or angular arrangement (position) of the individual wires 30, 31, 32. The lay length or twist pitch is typically expressed as the number of twists per meter.

As will be further discussed below, a reference direction BZ (see FIG. 2) can be derived or set, for example, from the orientation (longitudinal extension) of the marking data 34 on the sheathed cable 12. For example, the reference direction (plane) BZ may be perpendicular to the longitudinal extension of the marking 34, and thus to the longitudinal direction of the cable 12.

In this manner, the information concerning the twist of the sheathed cable 12 can be unambiguously associated and interpreted in the orientation, in which the sheathed cable 12 is inserted (held) in the holder 10.

In the alternative, the markings 34 on the sheathed cable 12 can be visually read by a person, and then the information (twist direction and lay length) concerning the twist of the sheathed cable 12 can be manually input into the control unit 14.

After electronically (optically) reading the marking 34 or manually inputting the twist data into the control unit 14, the sheathed cable 12, which is again fixedly held in the holder 10, is then severed or cut in the cutting device 24 as shown in FIG. 1C, so that the cross-section (terminal side) of the sheathed cable 12 is exposed at a defined end (first position) of the sheathed cable 12. As shown in FIG. 1D, the cross-section at the end can then be detected (recorded or captured) by the electronic camera 26. That is, the arrangement of the ends of the individual wires 30, 31, 32 can be digitally encoded into computer readable/processible data for image analysis and evaluation in the control unit 14, in order to determine the angular (rotational) position or one or more ends of the individual wires 30, 31, 32 in the cross-sectional view.

As a representative, non-limited example (algorithm) for an image analysis and evaluation that can be performed in this aspect of the present teachings, the control unit 14 may be configured (e.g., programmed) to receive, e.g., continuously or sampled at frequent or discretionary intervals, video images of the cross-sectional view of the end of the sheathed cable 12 generated by the camera 26. Preferably, the video image data is digital data, although the present teachings are also applicable to the use of analog video image data with the necessary modifications of the image analysis that is performed.

The outer diameter (periphery) of the cross-section of the sheathed cable 12 is then detected or located in the image data by performing image processing. For example, image segmentation may be performed for the purpose of performing the object detection (i.e. detection of the end of the sheathed cable 12 within the image data). A wide variety of image segmentation methods or algorithms may be used in this aspect of the present teachings, including but not limited to thresholding, clustering methods, compression-based methods, histogram-based methods, edge detection, dual clustering methods, region-growing methods, partial differential equation-based methods, graph partitioning methods, and watershed transformation. For example, such object detection may be performed using software and algorithms made available in the OpenCV (Open Source Computer Vision Library) software, which is an open source computer vision and machine learning software provided at www.opencv.org.

After identifying or locating the outer diameter of the sheathed cable 12 in the cross-sectional view, the center or middle point of the circle optionally may be determined or located. This center or middle point may be used to set the reference direction (BZ), as was discussed above.

The individual wires are then detected or located within outer periphery of the sheathed cable 12. In this respect, one or more characteristics or visually-detectable properties may be utilized to locate the individual wires in the image data. For example, and without limitation, the individual wires may be located based upon one or more of color of insulation, color of metal (in case the individual wires are respectively made of two or more different metals or metal alloys), diameter of the individual wires (e.g., the metal core or the outer diameter of the insulating surrounding the metal core), etc. In addition or in the alternative, one or more such characteristics (or other characteristics) detected in the image may be compared to one or more wire patterns stored in a memory of the control unit 14. In this respect, a set of wire patterns may be stored and indexed according to the information derivable by scanning/reading the markings 34 provided on the outside of the sheathed cable 12. After receiving such information concerning the markings 34, the control unit 14 may access the memory to retrieve the corresponding wire pattern for use in comparing to the image data. Again, software and algorithms made available in the OpenCV software may be used to analyze the image data for the above-noted characteristics and/or visually-detectable properties.

Then, the respective outer peripheries and the centers of the individual wires may be detected or located in the same manner as noted above.

The respective centers of the individual wires and the center (BZ) of the sheathed cable 12 may then be used to set or determine a coordinate system and to identify the angular position of one or more of the individual wires within the coordinate system.

The sheathed cable 12 may continue to rotate until a particular individual wire has reached a defined (target) angular position ($\beta$), at which time the rotation of the sheathed cable 12 is stopped. In the alternative, if the sheathed cable 12 is not being rotated during the image analysis, a single image may be captured, the centers of the sheathed cable 12 and the individual wires contained therein may be detected, and the angular position of one or more of the individual wires may be detected in the manner described above. Then, the sheathed cable 12 is rotated by an angle corresponding to the difference between an actual angular position and the target angular position of at least one of the individual wires.

Naturally, the image analysis may be performed in various ways known to persons skilled in the art in order to obtain the necessary data for use in calculating the angular position of one or more individual wires based upon a cross-sectional image at the end of the sheathed cable 12.

An exemplary cross-sectional view of the sheathed cable 12 is depicted in FIG. 2. The exemplary sheathed cable 12 contains three individual wires 30, 31, 32 disposed around its center M (cross-sectional center point) at equal angular spacings of 120°. In the depicted example the angular position (end angular position) of the right upper individual wire 31 is rotated by an angle $\alpha$ (in the depicted example approximately 45°) in the clockwise direction relative to the reference direction (plane) BZ, which extends perpendicularly through the center M of the holder 10. In the control unit 14, at least the angle $\alpha$ is then determined from the image data supplied from the camera 26, e.g., using known image recognition software.

The angular position of the individual wire 31 relative to the reference direction BZ can then be determined at a second (longitudinal) position that is spaced by a distance D from the free (terminal) end of the sheathed cable 12. This determination of the angular position of the individual wire 31 can be carried out, e.g., using the following formula (algorithm):

$$\beta = \alpha + [(+/-)D \times 360°/S],$$

wherein S is the (predetermined) lay length of the twist of the individual wires 30, 31, 32 (e.g., expressed as twists/meter), and the plus-sign or minus-sign before the distance D (also expressed in meters) is set (selected) in accordance with the twist direction that was determined above. Thus, the angle $\beta$ provides (represents) the angular position of the individual wire 31 relative to the reference direction (plane) BZ at the (second) longitudinal position that is located at the distance D from the free (terminal) end of the sheathed cable 12.

In FIG. 1E the sheathed cable 12 is displaced to the right by the length (distance) D relative to the holder 10 while maintaining the angular (rotational) position of the sheathed cable 12 relative to the holder 10. Therefore, the angular position of the individual wire 31 relative to the reference plane (direction) BZ is known at the second position, which is adjacent to the right of the holder 10. The sheath (insulating jacket) of the sheathed cable 12 is then stripped by the stripping device 28 starting from the second position that is located at the distance D from the end of the sheathed cable 12.

As was mentioned above in the Background section, it is advantageous for various purposes to know the angular position of the individual wires at a predetermined longitudinal position of the sheathed cable without having to first strip the insulating sheath (jacket) to expose the individual wires. According to the present teachings, it is only necessary to determine the angular position (end angular position) of one of the individual wires 30, 31, 32 (i.e. the angle α shown in FIG. 2) at the end of the sheathed cable 12, at which the internal cross-section of the sheathed cable 12 has been exposed (see FIG. 1D). As was explained above, if the twist direction and the lay length of the twist are known (e.g., by reading the markings 34), the angle β can then be calculated for each longitudinal position of the sheathed cable 12 that is spaced by a distance D (wherein D is a variable) from the end. As indicated above, the twist direction and the lay length may be determined, either electronically or visually, from the markings 34.

Preferably the rotating device 20 is further used to rotatably change the wire orientation about the cable axis, i.e. to change the angular position of the sheathed cable 12 relative to the holder 10. Thus in a first step the sheathed cable 12 can, for example, be rotationally aligned immediately after the sheathed cable 12 is inserted into the holder 10. Then, after the severing the sheathed cable 12 using the cutting device 24 and during the sensing (recording or capturing) of the end surface by the camera device 26, the sheathed cable 12 can be rotated such that a desired angular position of an individual wire at the predetermined distance D is achieved. For this purpose the angle β is calculated in advance and the sheathed cable 12 is rotatably oriented by the rotating device 20 in accordance with the calculated value of β. After the orienting and the fixed clamping of the sheathed cable 12 in the holder 10, the stripping process can take place at the distance D. In the alternative, the stripping device 28 rather than the sheathed cable 12 may be rotated accordingly in order to achieve the desired (calculated) angular position of the selected individual wire relative to the stripping device 28.

In addition or in the alternative, the device may be configured such that the individual wires at a predetermined longitudinal position of (along) the sheathed cable 12 must be arranged in a predetermined position/relationship with respect to the stripping device 28 before the stripping process is initiated. For example, one of the individual wires must be located a desired angle position (here angle β) with respect to the reference direction BZ, which is itself stationary/fixed with respect to the stripping device 28 and/or rotating device 20. To achieve this predetermined position/relationship, the desired angle position of one of the individual wires is determined/set in advance, and a target end angle position (here angle α) of that same wire is calculated by rearranging the above-mentioned formula as follows:

$$\alpha = \beta - [(+/-)D \times 360°/S],$$

and by inputting the desired angle position (angle β), the lay length (S), the twist direction (+/−) and the predetermined distance (longitudinal position) (D) to the end of the sheathed cable 12. The target end angle position (angle α) is thus the angle position of the same individual wire in the cross sectional view at the end of the sheathed cable 12, which is cut according to FIG. 1c), when that same individual wire is located at the desired angle position (angle β) at the predetermined distance/length D from the end of the sheathed cable 12.

In a next step, the sheathed cable 12 is rotated by the rotating device 20 until it is determined by the camera 26 and the control unit 14 (evaluation device) that the actual (current) end angle position coincides with the target end angle position. In order to make this determination, for example, a target picture may be generated in the control unit 14 from the calculated target end angle position and this target picture is then compared with one or more actual (current) pictures of the cross sectional view at the end of the sheathed cable 12, which picture(s) is (are) captured by the camera 26, until the control unit 14 determines that the target picture matches the actual (current) picture. When this determination is made, it is assured that the same individual wire is located at the desired angle position (angle β) at the distance/length D from the end of the sheathed cable 12.

In the alternative, the camera 26 may take a single picture of the cross sectional view at the end of the sheathed cable 12 and the control unit 14 may determine the actual (current) angle position of the individual wire, which must be at the desired angle position (angle β) at the predetermined distance/length D. Then the control unit 14 calculates the difference (angle) between the actual (current) angle position of that individual wire and its target end angle position. The control unit 14 then controls the rotating device 20 to rotate the sheathed cable 12 by the amount of the calculated difference (angle), so that the actual (current) angle position of the one individual wire matches the target end angle position thereof.

The mechanization and automation of the device can vary according to particular design requirements for the wire processing that will be performed. For example, the holder 10 can be manually operated, such that no actuator is required to clamp and unclamp the cable 12. Furthermore, the sheathed cable 12 also may be rotated about its longitudinal axis by hand, such that the rotating device 20 may be omitted. In such an embodiment, the sheathed cable 12 should be rotated far enough so that the marking 34 is detected (recorded or captured) by the optical recording device 22 connected to the control unit 14 and can be electronically evaluated in the control unit 14. However, it is also possible to omit the optical recording device 22 in case the marking 34 will be visually read; in such an embodiment, the device preferably includes another type of twist input device, such as, e.g., a keyboard, number key pad, mouse, etc. configured to manually input twist data into the control unit 14. The cutting device 24 can also be manually operated. It is only necessary to ensure that the angular position of the sheathed cable 12 as a whole, i.e. its rotational position relative to the longitudinal axis, is maintained after a cross-section image has been recorded (captured) by the camera 26, so that the orientation or angular position of the individual wires 30, 31, 32 relative to the reference direction BZ remains constant until the angular position of the individual wires 30, 31, 32 is determined at a predetermined (longitudinal) position (D) of the sheathed cable 12, which predetermined position is spaced by the predetermined distance (D) from the (end) position at which the cross-section image was detected.

In a "slimmed-down" version of the device, the control unit 14 may be an electronic evaluating device (e.g., processor and memory), in which merely the values of the lay length and of the twist direction associated with the detected marking data are stored. For example, the memory may contain a lookup table (LUT) containing a set of lay lengths and twist directions for known sheathed cables with the marking data (34) serving as an index to the LUT. The angle α to a predetermined reference direction (e.g., BZ) can also be directly evaluated graphically. The angle β, which one of the individual wires forms with the reference direction (plane) BZ at the predetermined longitudinal position of the sheathed cable 12, can then be calculated (determined), wherein it is important that the reference direction remains unchanged with regard to an imaginary or virtual longitudinal extension (cylindrical projection) of the outer circumference of the sheathed cable.

The lay length and the twist (pitch) direction need not be electronically determined (store) but can also be taken from a table that contains the meaning of (i.e. the information or data represented or encoded by) the marking 34. In this case, the lay length and the twist direction can also be input manually into the control unit 14 after being visually read from the marking 34 by an appropriate twist input device, as was discussed above.

The reading of the marking 34 for obtaining the information concerning the twist and the orientation of the sheathed cable can also be effected at any other point in time before the calculation of the angle β. For example, the reading of the marking 34 may be performed either before or after the end angular position of one or more of the individual wires is determined.

Alternatively, to determine the end angle position for determining the angle α, the determination of the angular position α can instead also be effected at any first position in the longitudinal direction of the stripped sheathed cable 12 and is not limited to the depicted determining of the end angle position at a defined (terminal) end of the sheathed cable 12. Based on the angular position determined at this first position, the angular position at a second position, which is spaced by the distance D therefrom, can be calculated. Furthermore, the sheathed cable 12 can also include an appropriate marking point at which the angular position of the individual wires 30, 31, 32 is predetermined or known, so that a corresponding calculation of the angular position can be effected at any other position starting from the marking point.

The marking data can contain further information about the precise geometric arrangement of the individual wires 30, 31, 32 in the sheathed cable 12. That is, the marking data can contain information concerning, for example, the radial distance of each of the wires from the center point in the cross-sectional surface of the sheathed cable, the thickness of the insulation (sheath) surrounding each of the individual wires, etc. The further information can also be calculated from image data at the first position. By using this further information, not only can the angular position of the individual wires relative to the reference direction thus be determined, but in addition the respective spatial coordinates of the individual wires inside the sheathed cable can also be precisely determined.

According to a further preferred embodiment, the twist direction may be determined from a cross-sectional view or from the configuration (layout) of the cross-sectional view of the sheathed cable 12. In this embodiment, only sheathed cables are used in which the direction of the sheathed cable and thus the twist direction can be unambiguously determined based upon the configuration of the cross-sectional view. In such a sheathed cable, the cross-sectional view of the sheathed cable in one longitudinal direction of the sheathed cable must differ from a (preferably the same) cross-sectional view in the other longitudinal direction of the sheathed cable. Unique features of the sheathed cable having the individual wires can be used as distinguishing features. The view of the individual features, e.g., the relative arrangement of the individual wires 30, 31, 32 with respect to one another and/or with respect to the sheathed cable 12 and/or individual features of the individual wires, is known at least for one twist direction (or direction of the cross-sectional view) and, for example, is recorded in a data sheet of the sheathed cable and/or is stored in the control unit 14. For example, one such sheathed cable 12 has three individual wires 30, 31, 32 and it is known that, when the first individual wire 30, the second individual wire 31, and the third individual wire 32 are disposed clockwise in this order about the longitudinal axis of the sheathed cable 12 in a cross-sectional view of the sheathed cable 12, the twist direction in the direction of the cross-sectional view is clockwise. "In the direction of the cross-sectional view" means that the twist direction goes/runs in the corresponding (clockwise or counterclockwise) direction starting from the transverse plane of the cross-sectional view and moving in the direction into the plane of the paper in the length (longitudinal) direction of the sheathed cable 12.

As a prerequisite for such a determination, the cross-sectional view transverse to the length (longitudinal) direction of the sheathed cable, which cross-sectional view is detected (recorded) by the optical recording device (e.g., camera 26), should not have any (imaginary) symmetry line or symmetry plane extending in the length (longitudinal) direction of the sheathed cable. Herein, the terms symmetry line or symmetry plane preferably refer to any geometries, materials, colors, etc. that are mirrored across this line/plane. A symmetry line is present if no difference between the two sides of the symmetry line is detectable by the optical recording device 26 that is used. Only if no symmetry is present is it ensured that, after severing the sheathed cable and viewing the end (terminal) surface thus formed (cross-section view) using the optical recording device, the direction of the sheathed cable and thus also the orientation of the twist direction can be unambiguously determined.

For example, as distinguishing aspects/features of the particular individual wires 30, 31, 32, it is possible to consider or use the colors of the insulation and/or different thicknesses of the individual wires and/or different materials of the individual wires and/or geometric shapes formed by the individual wires in the cross-sectional view of the sheathed cable, i.e., the relative arrangement of the individual wires in the sheathed cable. Alternatively other geometric features visible the cross-section, for example grounding structures, special markings, etc., can be used as distinguishing aspects/features. For example, in a cross-sectional view of the sheathed cable, if the color sequence of the insulation of the individual wires and/or the thickness sequence of the individual wires in the clockwise direction about the longitudinal axis of the sheathed cable is different from the color sequence of the insulation of the individual wires and/or the thickness sequence of the individual wires in the counterclockwise direction about the longitudinal axis of the sheathed cable in the same cross-sectional view, then such features may suitably service as distinguishing features according to the present teachings.

In such an embodiment, after the sheathed cable 12 is severed in a first step (see FIG. 1C), the color sequence of the individual wires 30, 31, 32 may be detected (sensed) by an optical recording device (optical sensor) and evaluated. In the control unit 14, the evaluated color sequence is compared to a reference color sequence, which, for example, is stored in the control unit 14. The control unit 14 may be further programmed to determine that, when the color sequence matches the reference color sequence, the twist direction starting from the cross-sectional view is clockwise, and if no match is present, it is counterclockwise. Thus the twist direction can be unambiguously determined based on the color sequence of the individual wires in the circumferential direction of the sheathed cable. From the thus-determined twist direction and the known data of the distance D and the lay length S, the precise arrangement of the individual wires at the longitudinal distance D can then be calculated according to the above-described formula for determining the value (angle) β.

The lay length S and/or distance D can be manually input/stored and/or can be read from the marking 34, as was described above.

Although some aspects of the present teachings have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or structural feature of a corresponding device.

Depending on the particular implementation requirements, exemplary embodiments of the control unit 14 may be implemented in hardware and/or in software. The control unit 14 may be implemented with a digital storage medium, for example a floppy disk, a DVD, a Blu-Ray disc, a CD, a ROM, a PROM, an EPROM, an EEPROM or a flash memory, a hard drive or another magnetic or optical storage device, on which electronically readable control signals are stored, which interact or can interact with a programmable hardware component such that the respective method is performed.

The programmable hardware component may comprise a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FGPA), e.g., including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the control unit 14 are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for performing one of the methods described herein. The data stream, the signal sequence, or the sequence of signals can for example be configured to be transferred via a data communications connection, for example via the Internet or another network. Exemplary embodiments are thus also signal sequences that represent data, which are intended for transmission via a network or a data communications connection, wherein the data represent the program.

A program according to an exemplary embodiment can implement one of the methods during its performance, for example, such that the program reads storage (memory) locations or writes one or more data elements into these storage (memory) locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage (memory) location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the motors and actuators described herein.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods and apparatus for determining the angular position of one or more wires inside an insulated (opaque) cable.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

Additional embodiments of the present teachings include, but are not limited to:

1. A method for determining an angular position of individual wires at a predetermined cross-sectional position in a multi-wire sheathed cable (12), which has, inside a sheath, a plurality of individual wires (30, 31, 32) twisted around one another with a predetermined lay length, wherein the angular position of the individual wires (30, 31, 32) is determined relative to a reference direction, which extends through the center of the sheathed cable (12), in a plane perpendicular to the longitudinal extension of the sheathed cable (12), the method including:

at an end of the sheathed cable (12), determining an end angle position of ends of the individual wires (30, 31, 32) relative to the reference direction, determining (or selecting) a distance between the end of the sheathed cable and the predetermined cross-sectional position in the longitudinal direction of the sheathed cable, and determining (calculating) the angular position of the individual wires (30, 31, 32) relative to the reference direction at the predetermined cross-sectional position based upon the lay length, the twist direction, and the distance.

2. The method according to embodiment 1, wherein a twist direction in the direction of the cross-sectional view is associated with a configuration of a cross-sectional view of the sheathed cable (12), the method further including:

detecting the configuration of the cross-sectional view and determining the twist direction in the direction of the cross-sectional view from the configuration of the cross-sectional view.

3. The method according to embodiment 2, wherein:

the configuration of the cross-sectional view is determined by a relative arrangement of individual wires (30, 31, 32) with respect to one another or by a pattern of the individual wires (30, 31, 32) derived from the cross-sectional view of the sheathed cable, and the detecting of the configuration includes the detecting of the relative arrangement of the individual wires (30, 31, 32) with respect to one another or of the resulting pattern of the individual wires (30, 31, 32), and the twist direction in the direction of the cross-sectional view is determined from the relative arrangement of the individual wires (30, 31, 32) or from the pattern.

4. The method according to embodiment 3, wherein the relative arrangement or the pattern is determined from colors of insulation of the individual wires (30, 31, 32) and/or from different thicknesses and/or from different materials of the individual wires (30, 31, 32).

5. The method according to one of embodiments 1 to 4, wherein in a cross-sectional view of the sheathed cable, a color sequence of the insulation of the individual wires (30, 31, 32) and/or a thickness sequence of the individual wires (30, 31, 32) and/or a sequence of materials of the individual wires (30, 31, 32) in the clockwise direction about the longitudinal axis of the sheathed cable is different from the color sequence of the insulation of the individual wires (30, 31, 32) and/or the thickness sequence of the individual wires (30, 31, 32) and/or the sequence of materials of the individual wires (30, 31, 32) in the counterclockwise direction about the longitudinal axis of the sheathed cable in the same cross-sectional view, and a twist direction in the direction of the cross-sectional view is associated with at least one color-sequence and/or at least one thickness-sequence and/or at least one sequence of materials, the method further including:

detecting the color sequence of the insulation of the individual wires (30, 31, 32) and/or the thickness sequence of the individual wires (30, 31, 32) and/or the sequence of materials and determining the twist direction in the direction of the cross-sectional view from the detected color sequence of the insulation of the individual wires (30, 31, 32) and/or the thickness sequence of the individual wires and/or the sequence of materials of the individual wires.

6. The method according to one of embodiments 2 to 5, wherein the sheathed cable (12) has no symmetry line in the cross-sectional view thereof.

7. The method according to one of embodiments 1 to 6, wherein the lay length and/or twist direction is determined by electronic evaluation of a marking (34) located on the outer surface of the sheathed cable (12).

8. A device, e.g., for carrying out the method according to any one of embodiments 1-7, including:

a camera (26) for generating image data of a cross-sectional view of an end of the sheathed cable (12), wherein the ends of the individual wires (30, 31, 32) are visible in the cross-sectional view, an evaluation device (14) for determining from the image data an end angle position of at least one individual wire relative to a reference direction (BZ) extending through the center of the sheathed cable in the cross-sectional plane, a distance input device for inputting a distance (D) between the end of the sheathed cable and a predetermined cross-sectional position of the sheathed cable in the longitudinal direction of the sheathed cable, a twist input device (22) for inputting the lay length and the twist direction, and a calculating (evaluation) device (14) that determines the angular position of the at least one individual wire relative to the reference direction (BZ) at the predetermined cross-sectional position based upon the end angle position, the distance (D), the lay length, and the twist direction.

9. The device according to embodiment 8, wherein:

a twist direction in the direction of the cross-sectional view is associated with a configuration of a cross-sectional view of the sheathed cable (12), and the twist input device includes an optical recording device (22) for detecting the configuration of the cross-sectional view and for determining the twist direction in the direction of the cross-sectional view from the configuration of cross-sectional view.

10. The device according to embodiment 9, wherein:

the configuration of the cross-sectional view is determined from a relative arrangement of individual wires (30, 31, 32) with respect to one another or from a pattern of the individual wires (30, 31, 32) derived from the cross-sectional view of the sheathed cable, and the detecting of the configuration includes the detecting of the relative arrangement of the individual wires (30, 31, 32) with respect to one another or of the resulting pattern of the individual wires (30, 31, 32), and the twist direction in the direction of the cross-sectional view is determined from the relative arrangement of the individual wires (30, 31, 32) or from the pattern.

11. The device according to embodiment 10, wherein the relative arrangement or the pattern is determined from colors of insulation of the individual wires (30, 31, 32) and/or from different thicknesses and/or from different materials of the individual wires (30, 31, 32).

12. The device according to embodiment 8, wherein
in a cross-sectional view of the sheathed cable, a color sequence of the insulation of the individual wires (30, 31, 32) and/or a thickness sequence of the individual wires (30, 31, 32) and or a sequence of materials of the individual wires (30, 31, 32) in the clockwise direction about the longitudinal axis of the sheathed cable is different from the color sequence of the insulation of the individual wires (30, 31, 32) and/or from the thickness sequence of the individual wires (30, 31, 32) and/or from the sequence of materials of the individual wires (30, 31, 32) in the counterclockwise direction about the longitudinal axis of the sheathed cable in the same cross-sectional view, and a twist direction in the direction of the cross-sectional view is associated with at least one color sequence and/or at least one thickness sequence and/or at least one sequence of materials, and the twist input device includes an optical recording device (22 or 26) for detecting the color sequence of the insulation of the individual wires (30, 31, 32) and/or the thickness sequence of the individual wires (30, 31, 32) and/or the sequence of materials of the individual wires (30, 31, 32) and for determining the twist direction in the direction of the cross-sectional view from the color sequence of the insulation of the individual wires (30, 31, 32) and/or from the thickness sequence of the individual wires and/or from the sequence of materials of the individual wires.

13. The device according to one of embodiments 9 to 12, wherein the sheathed cable (12) has no symmetry line in the cross-sectional view thereof.

14. The device according to one of embodiments 8 to 13, wherein the twist input device includes an optical recording device (22) for detecting a marking (34) located on the outer surface of the sheathed cable (12).

15. The device according to one of embodiments 8 to 14, wherein the distance input device includes a displacement measuring device (36), using which the distance (D) between the end of the sheathed cable and the predetermined position of the sheathed cable is measurable.

16. A method for aligning a multi-wire sheathed cable (12), which has, inside a sheath, a plurality of individual wires (30, 31, 32) twisted around one another with a predetermined lay length, such that, at a predetermined cross-sectional position, at least one individual wire (30, 31, 32) has a desired angle position relative to a reference direction (BZ), which extends through the center of the sheathed cable (12), in a plane perpendicular to the longitudinal extension of the sheathed cable (12), the method including:

determining a desired angle position (β) of the at least one individual wire (30, 31, 32) relative to the reference direction (BZ) at the predetermined cross-sectional position, determining a distance (D) between an end of the sheathed cable (12) and the predetermined cross-sectional position in the longitudinal direction of the sheathed cable (12), calculating a target end angle position (α) of the at least one individual wire (30, 31, 32) relative to the reference direction at the end of the sheathed cable (12) based upon the desired angle position (β) of the at least one individual wire (30, 31, 32) at the predetermined cross-sectional position, the lay length (S), the twist direction (+/−), and the distance (D), and rotating the sheathed cable (12) about its longitudinal axis until the actual (current) end angle position of the at least one individual wire (30, 31, 32) matches the calculated target end angle position of the at least one individual wire (30, 31, 32).

17. A device, e.g., for carrying out the method according to embodiment 16, including
a camera (26) for generating image data of a cross-sectional view of an end of the sheathed cable (12), in which cross-sectional view the end of the at least one individual wire (30, 31, 32) is visible, an evaluation device (14) for determining from the image data whether an actual end angle position of the at least one individual wire relative to a reference direction (BZ) extending through the center of the sheathed cable in a cross-sectional plane matches the target end angle position (α) or for determining from the image data an actual end angle position (α) of at least one of the individual wires in the cross-sectional view relative to a reference direction (BZ) that extends perpendicularly through a central longitudinal axis of the sheathed cable, a distance determination device for determining a distance (D) between the end of the sheathed cable (12) and the predetermined cross-sectional position of the sheathed cable in the longitudinal direction of the sheathed cable (12), a twist input device (22) for inputting the lay length (S) and the twist direction (+/−), a calculating device (14) that determines the target end angle position (α) of the at least one individual wire (30, 31, 32) relative to the reference direction (BZ) at the end of the sheathed cable based upon the desired angle position (β) of the at least one individual wire (30, 31, 32) at the predetermined cross-sectional position, the distance (D), the lay length (S), and the twist direction (+/−), and a rotating device (20) for rotating the sheathed cable (12) about its longitudinal axis based upon the determination of the evaluation device (14) until the actual end angle position of the at least one individual wire (30, 31, 32) matches the calculated target end angle position (α) of the at least one individual wire (30, 31, 32).

18. The method according to embodiment 16 or the device according to embodiment 17 further comprising one or more of the features of embodiments 1-15.

19. The method according to embodiment 16 or 18 or the device according to embodiment 17 or 18 further comprising:
a wire stripping device configured to strip the sheath away from the individual wires, the wire stripping device being controlled to initiate the stripping starting from the predetermined cross-sectional position in the longitudinal direction of the sheathed cable.

20. The method or device according to embodiment 19, wherein the twist input device includes an optical recording device configured to detect a marking disposed on the outer surface of the sheathed cable and to input a signal representative of the marking to the control unit.

21. A method for determining an angular position of at least one of a plurality of individual wires of a multi-wire sheathed cable,
wherein the plurality of individual wires are twisted around one another in a twist direction (+/−) and with a lay length (S), the plurality of individual wires are disposed within a sheath, and a reference direction is perpendicular to a central longitudinal axis of the sheathed cable, the method comprising:

at an end of the sheathed cable, electronically capturing an image of one or more ends of the individual wires relative to the reference direction in a first cross-sectional plane, performing an electronic image analysis on the electronic image data to determine an end angle position ($\alpha$) of the one or more ends of the individual wires relative to the reference direction in the first cross-sectional plane, determining a distance (D) in the longitudinal direction of the sheathed cable between the end of the sheathed cable and a second longitudinal position, and determining in an electronic computing device the angular position ($\beta$) of the at least one of the plurality of individual wires relative to the reference direction in a second cross-sectional plane at the second longitudinal position based upon the end angle position ($\alpha$), the lay length (S), the twist direction, and the distance (D).

22. The method according to embodiment 21, further comprising:

performing the electronic image analysis on the electronic image data to determine a configuration of the individual wires in the first cross-sectional plane and determining the twist direction from the configuration associated therewith.

23. The method according to embodiment 22, wherein:

the configuration of the cross-sectional view is determined based upon a relative arrangement of the individual wires with respect to one another or by a pattern of the individual wires derived from the image of the cross-sectional plane, and the step of determining the twist direction from the configuration associated therewith includes detecting the relative arrangement of the individual wires or detecting the resulting pattern of the individual wires, wherein the twist direction in the direction of the cross-sectional view is determined from the relative arrangement of the individual wires or from the pattern.

24. The method according to embodiment 23, wherein:

the individual wires exhibit different colors of insulation surrounding each individual wire, different thicknesses of the individual wires and/or different materials comprising each the individual wires, and the relative arrangement or the pattern is determined from the different colors of insulation, the different thicknesses and/or the different materials.

25. The method according to any one of embodiments 21-24, wherein:

in a cross-sectional view of the sheathed cable, a color sequence of insulation of the individual wires and/or a thickness sequence of the individual wires and/or a sequence of materials of the individual wires in the clockwise direction about the longitudinal axis of the sheathed cable is different from the color sequence of the insulation of the individual wires and/or the thickness sequence of the individual wires and/or the sequence of materials of the individual wires in the counterclockwise direction about the longitudinal axis of the sheathed cable in the same cross-sectional view, the twist direction of the individual wires in the direction of the cross-sectional view is associated with at least one color-sequence and/or at least one thickness-sequence and/or at least one sequence of materials, and the method further includes:

detecting the color sequence of the insulation of the individual wires and/or the thickness sequence of the individual wires and/or the sequence of materials and determining the twist direction in the direction of the cross-sectional view from the detected color sequence of the insulation of the individual wires and/or the detected thickness sequence of the individual wires and/or the detected sequence of materials of the individual wires.

26. The method according to any one of embodiments 21-25, wherein the sheathed cable has no symmetry line in the cross-sectional view thereof.

27. The method according to any one of embodiments 21-26, further comprising:

determining the lay length and/or the twist direction by electronically evaluating a marking disposed on the outer surface of the sheathed cable.

28. The method according to any one of embodiments 21-27, further comprising:

stripping the sheath starting from the second longitudinal position.

29. The method according to any one of embodiments 21-28, further comprising using a displacement measuring device to measure the distance (D) in the longitudinal direction of the sheathed cable between the end of the sheathed cable and a second longitudinal position.

30. The method according to any one of embodiments 22-29, wherein:

the image of the first cross-sectional plane is electronically captured by a digital camera, the image analysis and the calculation of the angular position ($\alpha$) are performed by a control unit, and the method further comprises:

optically reading a marking on the outer surface of the sheathed cable and transmitting a signal representative of the marking to the control unit, wherein the control unit determines the lay length and twist direction therefrom, and the control unit controls a wire stripping device to strip the sheath away from the individual wires starting from the second longitudinal position.

31. A device comprising:

a digital camera configured to generate image data of a cross-sectional view of an end of a sheathed cable, wherein ends of individual wires are visible in the cross-sectional view, the individual wires are twisted around each other with a lay length (S) and twist direction and the individual wires are disposed within a sheath of the sheathed cable, a control unit configured to determine from the image data an end angle position ($\alpha$) of at least one of the individual wires in the cross-sectional view relative to a reference direction (BZ) that extends perpendicularly through a central longitudinal axis of the sheathed cable, a distance determining device configured to determine a distance (D), in the longitudinal direction of the sheathed cable, between the end of the sheathed cable and a second longitudinal position of the sheathed cable, and a twist input device configured to input into the control unit the lay length (S) and the twist direction of the individual twisted wires, wherein the control unit is configured to determine an angular position ($\beta$) of the at least one of the individual wires relative to the reference direction (BZ) in a cross-sectional plane at the second longitudinal position based upon the end angle position ($\alpha$), the distance (D), the lay length (S), and the twist direction.

32. The device according to embodiment 31, wherein:
the control unit is configured to detect a configuration of the individual wires at the end of the sheathed cable based upon the image data of the cross-sectional view of the end of a sheathed cable, and the control unit is configured to determine the twist direction of the individual wires in the direction of the cross-sectional view from the detected configuration.

33. The device according to embodiment 32, wherein the control unit is configured to determine the twist direction based upon a relative arrangement of individual wires with respect to one another or from a pattern of the individual wires derived from the image data of the cross-sectional view of the sheathed cable.

34. The device according to embodiment 33, wherein the control unit is configured to determine the relative arrangement or the pattern from different colors of insulation of the individual wires and/or from different thicknesses of the individual wires and/or from different materials of the individual wires.

35. The device according to any one of embodiments 31-34, wherein
in a cross-sectional view of the sheathed cable, a color sequence of insulation of the individual wires and/or a thickness sequence of the individual wires and or a sequence of materials of the individual wires in the clockwise direction about the longitudinal axis of the sheathed cable is different from the color sequence of the insulation of the individual wires and/or from the thickness sequence of the individual wires and/or from the sequence of materials of the individual wires in the counterclockwise direction about the longitudinal axis of the sheathed cable in the same cross-sectional view, and the twist direction of the individual wires in the direction of the cross-sectional view is associated with at least one color-sequence and/or at least one thickness-sequence and/or at least one sequence of materials, and the control unit is further configured to:
detect the color sequence of the insulation of the individual wires and/or the thickness sequence of the individual wires and/or the sequence of materials from the image data of the cross-sectional view of the sheathed cable and
determine the twist direction in the direction of the cross-sectional view from the detected color sequence of the insulation of the individual wires and/or the detected thickness sequence of the individual wires and/or the detected sequence of materials of the individual wires.

36. The device according to any one of embodiments 31-35, wherein the sheathed cable has no symmetry line in the cross-sectional view thereof.

37. The device according to any one of embodiments 31-36, wherein the twist input device includes an optical recording device configured to detect a marking disposed on the outer surface of the sheathed cable and to input a signal representative of the marking to the control unit.

38. The device according to any one of embodiments 31-37, wherein the distance input device includes a displacement measuring device configured to measure the distance (D) between the end of the sheathed cable and the second longitudinal position of the sheathed cable.

39. The device according to embodiment 38, further comprising:
a wire stripping device configured to strip the sheath away from the individual wires, the wire stripping device being controlled by the control unit to initiate the stripping starting from the second longitudinal position.

40. The device according to embodiment 39, wherein the twist input device includes an optical recording device configured to detect a marking disposed on the outer surface of the sheathed cable and to input a signal representative of the marking to the control unit.

REFERENCE NUMBER LIST

10 Holder
12 Sheathed cable
14 Control unit (evaluation device)
16 Inputs
18 Outputs
20 Rotating device
22 Optical recording device
24 Cutting device
26 Camera
28 Stripping device
30, 31, 32 Individual wires
34 Marking
36 Distance determining device

I claim:

1. A method for aligning a multi-wire sheathed cable containing a plurality of individual wires,
wherein the plurality of individual wires are twisted around one another in a twist direction (+/−) and with a lay length (S),
the plurality of individual wires are disposed within a sheath, and
a reference direction is perpendicular to a central longitudinal axis of the sheathed cable,
the method comprising:
determining a desired angle position ($\beta$) of at least one of the plurality of individual wires relative to the reference direction at a predetermined cross-sectional position in a longitudinal direction of the sheathed cable,
determining a distance (D) between an end of the sheathed cable and the predetermined cross-sectional position in the longitudinal direction of the sheathed cable,
calculating a target end angle position ($\alpha$) of the at least one of the plurality of individual wires relative to the reference direction at the end of the sheathed cable based upon the desired angle position ($\beta$) of the at least one of the plurality of individual wires at the predetermined cross-sectional position, the lay length (S), the twist direction (+/−), and the distance (D), and
rotating the sheathed cable about its longitudinal axis until the actual end angle position of the at least one of the plurality of individual wires matches the calculated target end angle position of the at least one of the plurality of individual wires.

2. The method according to claim 1, further comprising:
at the end of the sheathed cable, electronically capturing an image of at least one of the plurality of individual wires relative to the reference direction in a first cross-sectional plane,
performing an electronic image analysis on the electronic image data to determine an actual end angle position ($\alpha$) of the at least one of the plurality of individual wires relative to the reference direction in the first cross-sectional plane, and
stopping the rotation of the sheathed cable when the actual end angle position matches the target end angle position ($\alpha$).

3. The method according to claim 2, further comprising:
performing the electronic image analysis on the electronic image data to determine a configuration of the individual wires in the first cross-sectional plane and
determining the twist direction from the configuration associated therewith.

4. The method according to claim 3, wherein:
the configuration of the cross-sectional view is determined based upon a relative arrangement of the individual wires with respect to one another or by a pattern of the individual wires derived from the image of the cross-sectional plane, and
the step of determining the twist direction from the configuration associated therewith includes detecting the relative arrangement of the individual wires or detecting the resulting pattern of the individual wires, wherein the twist direction in the direction of the cross-sectional view is determined from the relative arrangement of the individual wires or from the pattern.

5. The method according to claim 4, wherein:
the individual wires exhibit different colors of insulation surrounding each individual wire, different thicknesses of the individual wires and/or different materials comprising each the individual wires, and
the relative arrangement or the pattern is determined from the different colors of insulation, the different thicknesses and/or the different materials.

6. The method according to claim 2, wherein:
in a cross-sectional view of the sheathed cable, a color sequence of insulation of the individual wires and/or a thickness sequence of the individual wires and/or a sequence of materials of the individual wires in the clockwise direction about the longitudinal axis of the sheathed cable is different from the color sequence of the insulation of the individual wires and/or the thickness sequence of the individual wires and/or the sequence of materials of the individual wires in the counterclockwise direction about the longitudinal axis of the sheathed cable in the same cross-sectional view,
the twist direction of the individual wires in the direction of the cross-sectional view is associated with at least one color-sequence and/or at least one thickness-sequence and/or at least one sequence of materials, and
the method further includes:
detecting the color sequence of the insulation of the individual wires and/or the thickness sequence of the individual wires and/or the sequence of materials and
determining the twist direction in the direction of the cross-sectional view from the detected color sequence of the insulation of the individual wires and/or the detected thickness sequence of the individual wires and/or the detected sequence of materials of the individual wires.

7. The method according to claim 1, further comprising:
determining the lay length and/or the twist direction by electronically evaluating a marking disposed on the outer surface of the sheathed cable.

8. The method according to claim 3, wherein:
the image of the first cross-sectional plane is electronically captured by a digital camera,
the image analysis and the calculation of the target end angular position ($\alpha$) are performed by a control unit, and
the method further comprises:
optically reading a marking on the outer surface of the sheathed cable and transmitting a signal representative of the marking to the control unit, wherein the control unit determines the lay length and twist direction therefrom, and
the control unit controls a wire stripping device to strip the sheath away from the individual wires starting from the predetermined cross-sectional position.

9. A device for aligning a multi-wire sheathed cable containing a plurality of individual wires, the device comprising:
a digital camera configured to generate image data of a cross-sectional view of an end of a sheathed cable, wherein ends of the individual wires are visible in the cross-sectional view, the individual wires are twisted around each other with a lay length (S) and twist direction (+/−) and the individual wires are disposed within a sheath of the sheathed cable,
a control unit configured to determine from the image data: (i) whether an actual end angle position ($\alpha$) of at least one of the individual wires relative to a reference direction, which extends through the center of the sheathed cable in a cross-sectional plane, matches a target end angle position ($\alpha$) or (ii) the actual end angle position ($\alpha$) of at least one of the individual wires in the cross-sectional view relative to the reference direction,
a distance input device configured to input a distance (D) between the end of the sheathed cable and a predetermined cross-sectional position of the sheathed cable in the longitudinal direction of the sheathed cable, and
a twist input device configured to input the lay length (S) and the twist direction (+/−),
wherein the control unit is further configured to determine the target end angle position ($\alpha$) of the at least one of the individual wires relative to the reference direction at the end of the sheathed cable based upon a desired angle position ($\beta$) of the at least one of the individual wires at the predetermined cross-sectional position, the distance (D), the lay length (S), and the twist direction (+/−), and
a rotating device is configured to rotate the sheathed cable about its longitudinal axis based upon the determination of the control unit until the actual end angle position of the at least one of the individual wires matches the calculated target end angle position ($\alpha$) of the at least one of the individual wires.

10. The device according to claim 9, wherein:
the control unit is configured to detect a configuration of the individual wires at the end of the sheathed cable based upon the image data of the cross-sectional view of the end of a sheathed cable, and
the control unit is configured to determine the twist direction of the individual wires in the direction of the cross-sectional view from the detected configuration.

11. The device according to claim 10, wherein the control unit is configured to determine the twist direction based upon a relative arrangement of individual wires with respect to one another or from a pattern of the individual wires derived from the image data of the cross-sectional view of the sheathed cable.

12. The device according to claim 11, wherein the control unit is configured to determine the relative arrangement or the pattern from different colors of insulation of the individual wires and/or from different thicknesses of the individual wires and/or from different materials of the individual wires.

13. The device according to claim 9, wherein
in a cross-sectional view of the sheathed cable, a color sequence of insulation of the individual wires and/or a thickness sequence of the individual wires and or a sequence of materials of the individual wires in the clockwise direction about the longitudinal axis of the sheathed cable is different from the color sequence of the insulation of the individual wires and/or from the thickness sequence of the individual wires and/or from the sequence of materials of the individual wires in the counterclockwise direction about the longitudinal axis of the sheathed cable in the same cross-sectional view, and the twist direction of the individual wires in the direction of the cross-sectional view is associated with at least one color-sequence and/or at least one thickness-sequence and/or at least one sequence of materials, and the control unit is further configured to:

detect the color sequence of the insulation of the individual wires and/or the thickness sequence of the individual wires and/or the sequence of materials from the image data of the cross-sectional view of the sheathed cable and determine the twist direction in the direction of the cross-sectional view from the detected color sequence of the insulation of the individual wires and/or the detected thickness sequence of the individual wires and/or the detected sequence of materials of the individual wires.

14. The device according to claim 9, wherein the twist input device includes an optical recording device configured to detect a marking disposed on the outer surface of the sheathed cable and to input a signal representative of the marking to the control unit.

15. The device according to claim 9, wherein the distance input device includes a displacement measuring device configured to measure the distance (D) between the end of the sheathed cable and the predetermined cross-sectional position of the sheathed cable.

16. The device according to claim 15, further comprising:

a wire stripping device configured to strip the sheath away from the individual wires, the wire stripping device being controlled by the control unit to initiate the stripping starting from the predetermined cross-sectional position.

17. The device according to claim 16, wherein the twist input device includes an optical recording device configured to detect a marking disposed on the outer surface of the sheathed cable and to input a signal representative of the marking to the control unit.

18. A device comprising:

a digital camera configured to generate image data of a cross-sectional view of an end of a sheathed cable, wherein ends of individual wires are visible in the cross-sectional view, the individual wires are twisted around each other with a lay length (S) and twist direction and the individual wires are disposed within a sheath of the sheathed cable, a control unit configured to determine from the image data an end angle position ($\alpha$) of at least one of the individual wires in the cross-sectional view relative to a reference direction (BZ) that extends perpendicularly through a central longitudinal axis of the sheathed cable, a distance determining device configured to determine a distance (D), in the longitudinal direction of the sheathed cable, between the end of the sheathed cable and a second longitudinal position of the sheathed cable, and a twist input device configured to input into the control unit the lay length (S) and the twist direction of the individual twisted wires, wherein the control unit is configured to determine an angular position ($\beta$) of the at least one of the individual wires relative to the reference direction (BZ) in a cross-sectional plane at the second longitudinal position based upon the end angle position ($\alpha$), the distance (D), the lay length (S), and the twist direction.

19. The device according to claim 18, further comprising:

a wire stripping device configured to strip the sheath away from the individual wires, the wire stripping device being controlled by the control unit to initiate the stripping starting from the second longitudinal position.

20. The device according to claim 19, wherein the twist input device includes an optical recording device configured to detect a marking disposed on the outer surface of the sheathed cable and to input a signal representative of the marking to the control unit.

* * * * *